United States Patent
Miyashiro et al.

(10) Patent No.: US 10,232,464 B2
(45) Date of Patent: Mar. 19, 2019

(54) ULTRASONIC BONDING JIG, ULTRASONIC BONDING METHOD, AND BONDING STRUCTURE

(71) Applicant: NIPPON MEKTRON, LTD., Tokyo (JP)

(72) Inventors: Hiroshi Miyashiro, Tokyo (JP); Yoichi Suruga, Tokyo (JP); Shuhei Koyano, Tokyo (JP)

(73) Assignee: NIPPON MEKTRON, LTD., Tokyo (JP)

( * ) Notice: Subject to any disclaimer, the term of this patent is extended or adjusted under 35 U.S.C. 154(b) by 0 days.

(21) Appl. No.: 15/936,568

(22) Filed: Mar. 27, 2018

(65) Prior Publication Data

US 2019/0054562 A1    Feb. 21, 2019

(30) Foreign Application Priority Data

Aug. 15, 2017   (JP) .................. 2017-156753

(51) Int. Cl.
| | | |
|---|---|---|
| *B23K 20/00* | (2006.01) | |
| *B23K 20/10* | (2006.01) | |
| *B29C 65/00* | (2006.01) | |
| *B29C 65/08* | (2006.01) | |

(52) U.S. Cl.
CPC ............ *B23K 20/106* (2013.01); *B29C 65/08* (2013.01); *B29C 66/81435* (2013.01)

(58) Field of Classification Search
CPC .............................. B23K 20/106; B23K 20/10
USPC .......... 228/1.1, 110.1, 111, 44.3, 4.1, 4.5, 54
See application file for complete search history.

(56) References Cited

U.S. PATENT DOCUMENTS

2017/0120372 A1* 5/2017 Poncelet .............. B23K 20/004

FOREIGN PATENT DOCUMENTS

WO    2013/105361 A1    7/2013

* cited by examiner

*Primary Examiner* — Erin B Saad
(74) *Attorney, Agent, or Firm* — Studebaker & Brackett PC

(57) ABSTRACT

An ultrasonic bonding jig includes: a plurality of protrusions; a planar portion among protrusions formed among base ends of the protrusions; and recessed portions recessed to a side opposite to a projection direction of the protrusions, the recessed portions being formed on both sides in a vibration direction of the protrusions.

6 Claims, 10 Drawing Sheets

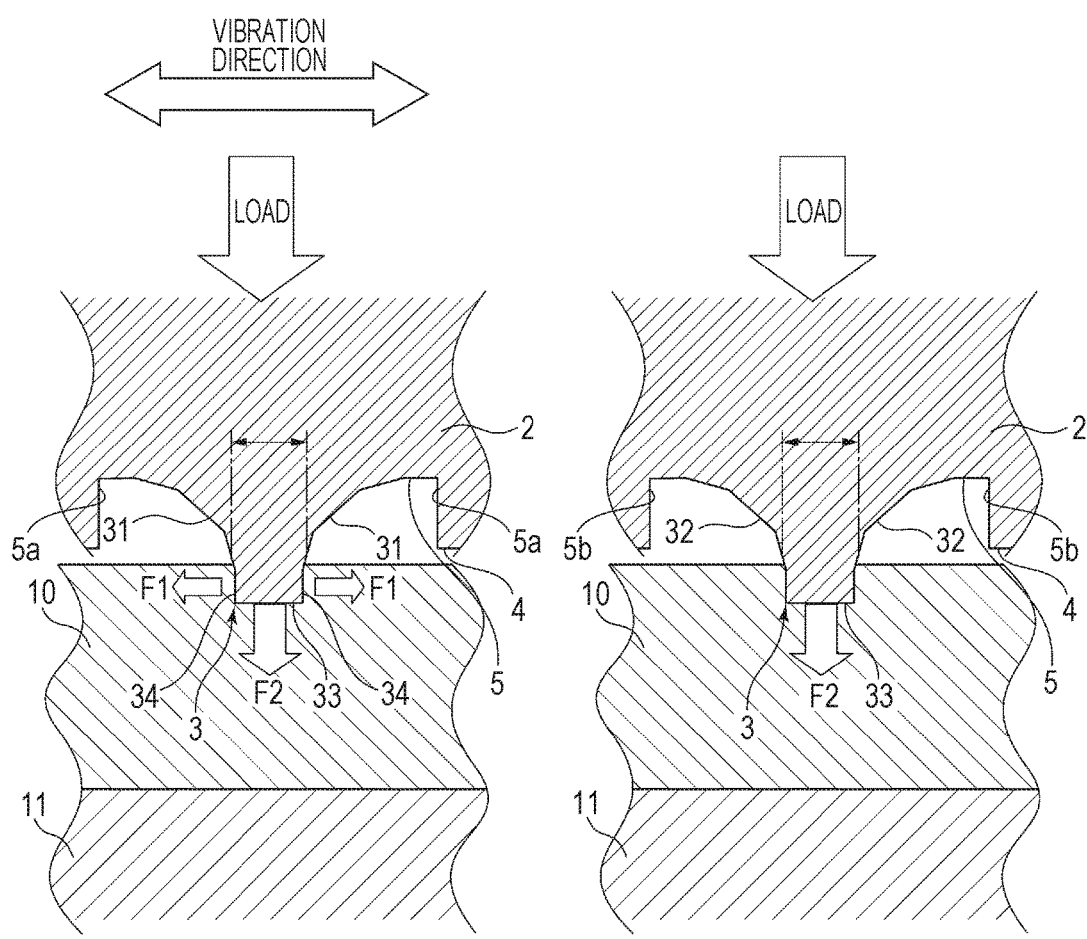

ULTRASONIC BONDING JIG, ULTRASONIC BONDING METHOD, AND BONDING STRUCTURE

CROSS-REFERENCE TO RELATED APPLICATION

This application claims priority from Japanese Patent Application No. 2017-156753 filed with the Japan Patent Office on Aug. 15, 2017, the entire content of which is hereby incorporated by reference.

BACKGROUND

1. Technical Field

The present disclosure relates to an ultrasonic bonding jig, an ultrasonic bonding method, and a bonding structure.

2. Description of the Related Art

In ultrasonic bonding, a metal plate and a metallic base material are stacked and placed on a support table. In this state, while the metal plate is pressed by an ultrasonic bonding jig, ultrasonic vibration is performed on the ultrasonic bonding jig at a predetermined frequency in a horizontal direction. Thus, pressing force and the ultrasonic vibration from the ultrasonic bonding jig act on opposed surfaces of the metal plate and the base material. Consequently, an oxide and other dirt on surfaces of the metals are removed. Furthermore, friction heating generated by the pressing force and the ultrasonic vibration generates bonding between metal atoms.

A chip (an ultrasonic bonding jig) disclosed in WO 2013/105361 A (the ninth page, the second drawing) includes a plurality of protrusions arranged in a grid pattern on a processed surface abutting on an electrode laminated body (a metal plate). Chamfers are provided on a contour line of the protrusions disposed on an outermost periphery among the plurality of protrusions such that the protrusions have an arc having a radius R meeting $R \geq A/6$ when an external dimension in the one direction is defined as A. This restrains a break of the electrode laminated body caused by ultrasonic bonding.

SUMMARY

An ultrasonic bonding jig includes: a plurality of protrusions; a planar portion among protrusions formed among base ends of the protrusions; and recessed portions recessed to a side opposite to a projection direction of the protrusions, the recessed portions being formed on both sides in a vibration direction of the protrusions.

BRIEF DESCRIPTION OF THE DRAWINGS

FIG. 6A is a front cross-sectional view illustrating a state where a metal foil is pressed by the head while the protrusions are vibrated for ultrasonic bonding of the metal foil with a busbar, and FIG. 6B is similarly a cross-sectional side view;

DESCRIPTION OF THE EMBODIMENTS

Figure 1:
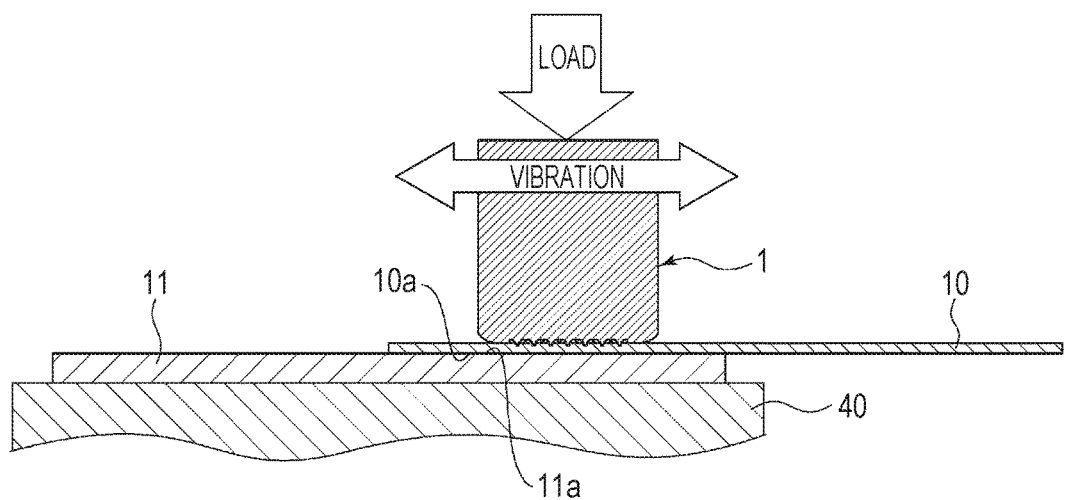
FIG. 1 illustrates a principle of ultrasonic bonding according to a first embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A technique in WO 2013/105361 A performs ultrasonic vibration where distal end portions of protrusions bite into an electrode laminated body while the electrode laminated body is pressed by the plurality of protrusions on a processed surface of a chip. Therefore, when the protrusions vibrate relative to the electrode laminated body, a force acting from side surfaces on both sides of the protrusions in the vibration direction caused by the vibration presses up an electrode laminated body component (a metal plate component). Hence, a force by the vibration acting on opposed surfaces of the electrode laminated body and a base material decreases. Consequently, bonding strength of the electrode laminated body with the base material lowers especially in the case of the electrode laminated body being a thin film.

One object of the present is to provide an ultrasonic bonding jig and an ultrasonic bonding method that can maintain a force caused by vibration acting on opposed surfaces of a metal plate and a metallic base material large and a bonding structure with a high bonding strength.

An ultrasonic bonding jig according to an aspect of the present disclosure (the present bonding jig) includes: a plurality of protrusions; a planar portion among protrusions formed among base ends of the protrusions; and recessed portions recessed to a side opposite to a projection direction of the protrusions, the recessed portions being formed on both sides in a vibration direction of the protrusions.

According to this bonding jig, when the plurality of protrusions presses the metal plate and bite into the metal plate, the bulges of the metal plate components, which are generated at both sides in the vibration direction of the protrusions, are held in the recessed portions, which are recessed on the side opposite to the projection direction of the protrusions. This ensures excellent contact of the planar portion among protrusions with the surface of the metal plate. This allows maintaining the force caused by the vibration acting on the opposed surfaces of the metal plate with the metallic base material large.

In this bonding jig, the recessed portions may be formed at all peripheral areas of the protrusions. According to this, when the plurality of protrusions presses the metal plate and bite into the metal plate, the bulges of the metal plate components, which are generated at all peripheral areas of the protrusions, are held in the recessed portions, which are recessed on the side opposite to the projection direction of the protrusions. This ensures more excellent contact of the planar portion among protrusions with the surface of the metal plate. This allows maintaining the force caused by the vibration acting on the opposed surfaces of the metal plate with the metallic base material large.

In this bonding jig, the recessed portions may be formed to have a shape identical to that of the base ends of the protrusions. According to this, the recessed portion is formed so as to have the identical shape to the base end of the protrusion, so that the side surfaces of the recessed portion are arranged in a complementary manner to the side surfaces of the protrusion. This ensures easily holding the bulges of the metal plate components, which are generated by being pressed up by the side surfaces of the protrusions, in the recessed portions.

In this bonding jig, the base ends of the protrusions may be disposed upright from bottom surfaces of the recessed portions. According to this, the base end of the protrusion is disposed upright from the bottom surface of the recessed portion. This allows increasing a capacity inside the recessed portions to hold the bulges of the metal plate components, which are generated by being pressing up by the side surfaces of the protrusions.

An ultrasonic bonding method according to an aspect of the present disclosure (the present bonding method) includes: stacking a base material and a metal plate that is thicker than a height of the protrusions of the ultrasonic bonding jig; pressing, with the above-described ultrasonic bonding jig, the metal plate to the base material; and vibrating the ultrasonic bonding jig.

According to this bonding method, the distal ends of the protrusions do not penetrate the metal plate or contact the base material. Therefore, the strength of the metal plate during processing is maintained. This allows the planar portion among protrusions formed among the base ends of the protrusions to contact the surface of the metal plate while the recessed portions internally hold the bulges of the metal plate components formed at the peripheral areas of the protrusions. This ensures efficiently acting, on the metal plate, the force caused by the pressing force and the vibration. Consequently, the metal plate and the base material can be excellently bonded together.

A bonding structure according to an aspect of the present disclosure (the present bonding structure) includes a bonding portion of a metal plate and a metallic base material, wherein the bonding portion has: a recessed portion with a closed bottom, being formed on a surface of the metal plate; a flat portion among recessed portions, being formed at peripheral areas of the recessed portions; and bulges of components of the metal plate, being formed along openings of the recessed portions at the flat portion among recessed portions.

According to this bonding structure, the recessed portions with the closed bottoms do not penetrate the metal plate. This ensures securing the wide bonded regions between the metal plate and the base material. Furthermore, the bonding strength between the metal plate and the base material can be enhanced. Furthermore, whether the ultrasonic vibration is provided to the metal plate or not is found by the presence/absence of the bulges of the metal plate components, which are formed along the openings of the recessed portions by the vibration of the protrusions of the ultrasonic bonding jig. Accordingly, whether the metal plate and the metallic base material are correctly bonded together or not can be determined.

In this bonding structure, the metal plate and the base material may be bonded together between the adjacent recessed portions. According to this, not only the recessed portions but also the metal plate and the base material are bonded together between the adjacent recessed portions. This bonds the bonded regions (the bonding portion) of the metal plate with the base material to be approximately uniform. Therefore, the bonding strength of the metal plate with the base material can be further enhanced.

The following describes embodiments of the ultrasonic bonding jig, the ultrasonic bonding method, and the bonding structure according to the present.

First Embodiment

The following describes the ultrasonic bonding jig according to the first embodiment with reference to FIGS. 1 to 9C. The following defines the paper-surface-front side of FIG. 2A and the paper-surface-top side of FIG. 2B as the front surface side (the front side) of the ultrasonic bonding jig. Furthermore, the following defines the top, bottom, right, and left directions as the top, bottom, right, and left directions when the ultrasonic bonding jig is viewed from the front side in some cases.

As illustrated in FIG. 1, in the ultrasonic bonding, a metal foil 10 (a metal plate) as a laminated body made of gold, silver, copper, or the like is stacked on a metallic busbar 11 (a base material) and are placed on a support table 40. In this state, while the metal foil 10 is pressed by a head 1 (the ultrasonic bonding jig) mounted to an ultrasonic bonding machine, ultrasonic vibration (hereinafter sometimes simply referred to as "vibration") is performed on the head 1 at a predetermined frequency in a horizontal direction. Thus, pressing force and the ultrasonic vibration of the head 1 act on an opposed surface 10a of the metal foil 10 with the busbar 11 and an opposed surface 11a of the busbar 11 with the metal foil 10. Consequently, an oxide and other dirt on the metal surfaces are removed, and further friction heating generated by the pressing force and the ultrasonic vibration bond metal atoms together. Furthermore, the ultrasonic bonding machine used in the present embodiment is a general ultrasonic bonding machine referred to as a head 1 that linearly vibrates back and forth at a predetermined frequency in a horizontal direction. Accordingly, the following omits the detailed explanations and illustrations of a structure and a behavior, of the ultrasonic bonding machine.

Figure 2A:
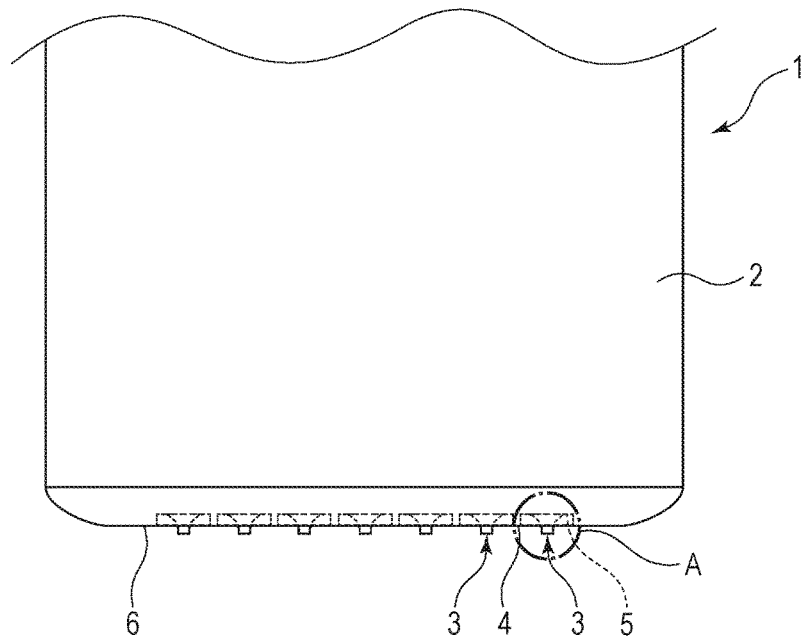
FIG. 2A is a side view illustrating a structure of a head as an ultrasonic bonding jig of the first embodiment.
Figure 2B:
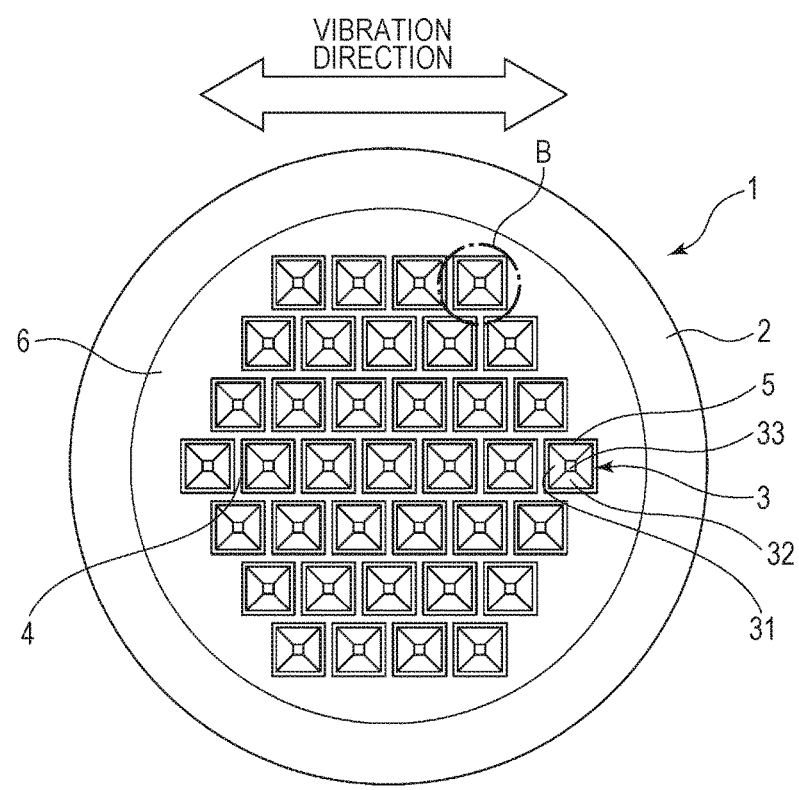
FIG. 2B is a plan view illustrating a structure of the head viewed from the below.

First, the following describes the structure of the head 1. As illustrated in FIGS. 2A and 2B, the head 1 is made of metal such as an aluminum alloy or a titanium alloy. The head 1 mainly includes a cylindrical-shaped body 2, a plurality of protrusions 3, a planar portion among protrusions 4, and recessed portions 5. The protrusions 3 project downward from a lower end surface of the body 2. The planar portion among protrusions 4 is formed among base ends of the adjacent protrusions 3. The recessed portions 5 are disposed adjacent to peripheral areas of the protrusions 3 at the planar portion among protrusions 4. The plurality of protrusions 3 and the recessed portions 5 are arranged into a houndstooth pattern at an inner diameter side on the lower end surface of the body 2. FIG. 2A illustrates the protrusions 3 and the recessed portions 5 arranged at uniform intervals in a right-left direction. FIG. 2A schematically illustrates only the protrusions 3 and the recessed portions 5 (see FIG. 2B) arranged at an approximately center in the front-rear direction on the lower end surface of the body 2. The planar portion among protrusions 4 may have a width in a range of ½ times to double of a width of the protrusion 3 in a horizontal direction and preferably has a width in a range of ¾ to 5/4 times of the width of the protrusion 3 in the horizontal direction.

An annular planar portion 6 is formed at an outer diameter side on the lower end surface of the body 2. The protrusions 3 and the recessed portions 5 are not disposed across the whole circumference of the annular planar portion 6. The annular planar portion 6 is formed coplanar to the above-described planar portion among protrusions 4.

As illustrated in FIG. 2B, the protrusions 3 are arrayed in the right-left direction along the vibration direction of the head 1. The protrusion 3 includes first walls 31, second walls 32, and a protrusion end surface 33. The first walls 31 constitute a pair of side surfaces extending in a direction approximately perpendicular to the vibration direction and arranged so as to be opposed to one another along the vibration direction. The first walls 31 are side surfaces of the protrusion 3, the side surfaces positioned in the vibration direction. The second walls 32 constitute a pair of side surfaces extending approximately parallel to the vibration direction and arranged so as to be opposed to one another along the direction approximately perpendicular to the vibration direction. The second walls 32 are side surfaces of the protrusion 3, the side surfaces being positioned in a direction approximately perpendicular to the vibration direction. The protrusion end surface 33 is arranged at the distal end of the protrusion 3. The protrusion end surface 33 is constituted so as to be a flat surface approximately parallel to the lower end surface of the body 2. Thus, the protrusion 3 has a truncated square pyramid shape including the first walls 31, the second walls 32, and the protrusion end surface 33. A cross-sectional surface of the protrusion 3, the cross-sectional surface being parallel to the lower end surface of the body 2, has a rectangular shape. The first walls 31 and the second walls 32 of the protrusion 3 have a configuration approximately identical to one another. Therefore, although the explanation is given on the first walls 31, the following omits the explanation of the second walls 32.

Figure 3:
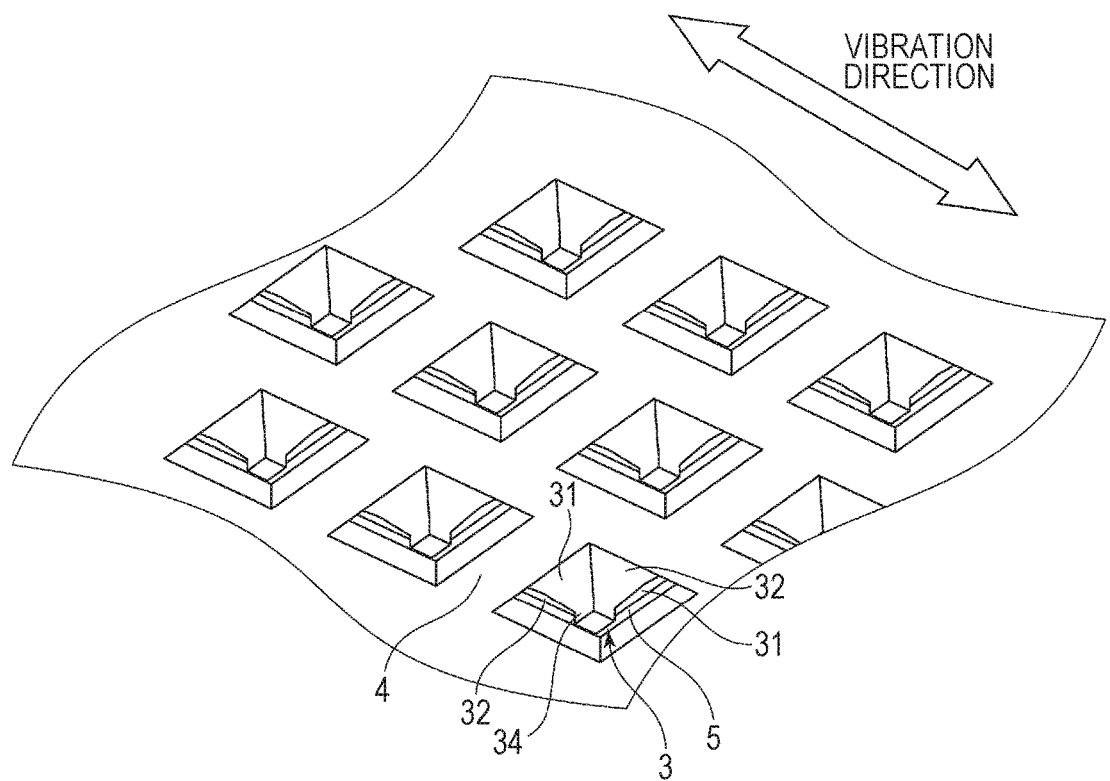
FIG. 3 is a perspective view illustrating shapes of protrusions and recessed portions formed on the head.
Figure 4:
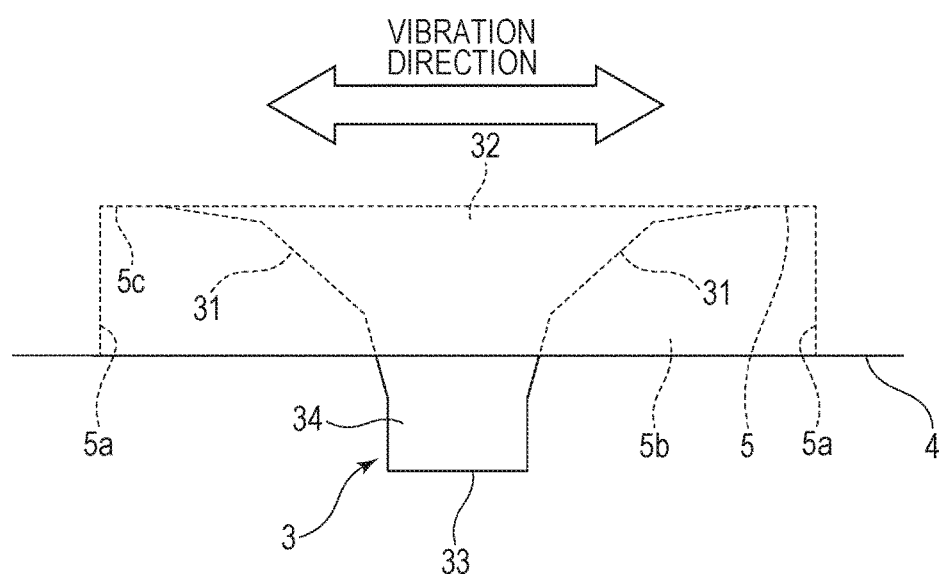
FIG. 4 is an enlarged view of a surrounded portion A in FIG. 2A and is a front view illustrating the shapes of the protrusion and the recessed portion.

As illustrated in FIGS. 3 and 4, the first wall 31 has a tapered shape tapered off toward the distal end (the lower side, the protrusion end surface 33) of the protrusion 3. Furthermore, the first wall 31 has a perpendicular surface portion 34 formed approximately perpendicular to the vibration direction at the distal end side of the protrusion 3. The first wall 31 is constituted such that an inclination angle with respect to the vibration direction increases in stages from the perpendicular surface portion 34 to the base end. This inclination angle is an angle outside the protrusion 3 among the angles formed by the first wall 31 of the protrusion 3 and the lower end surface (the planar portion among protrusions 4) of the body 2. This forms the entire first wall 31 so as to have an approximately quadrant shape. The above-described inclination angle of the first wall 31 with respect to the vibration direction may be an angle inside the protrusion 3 among the angles formed by the first wall 31 of the protrusion 3 and the lower end surface (the planar portion among protrusions 4) of the body 2. In this case, the inclination angle decreases in stages from the perpendicular surface portion 34 to the base end.

Figure 5:
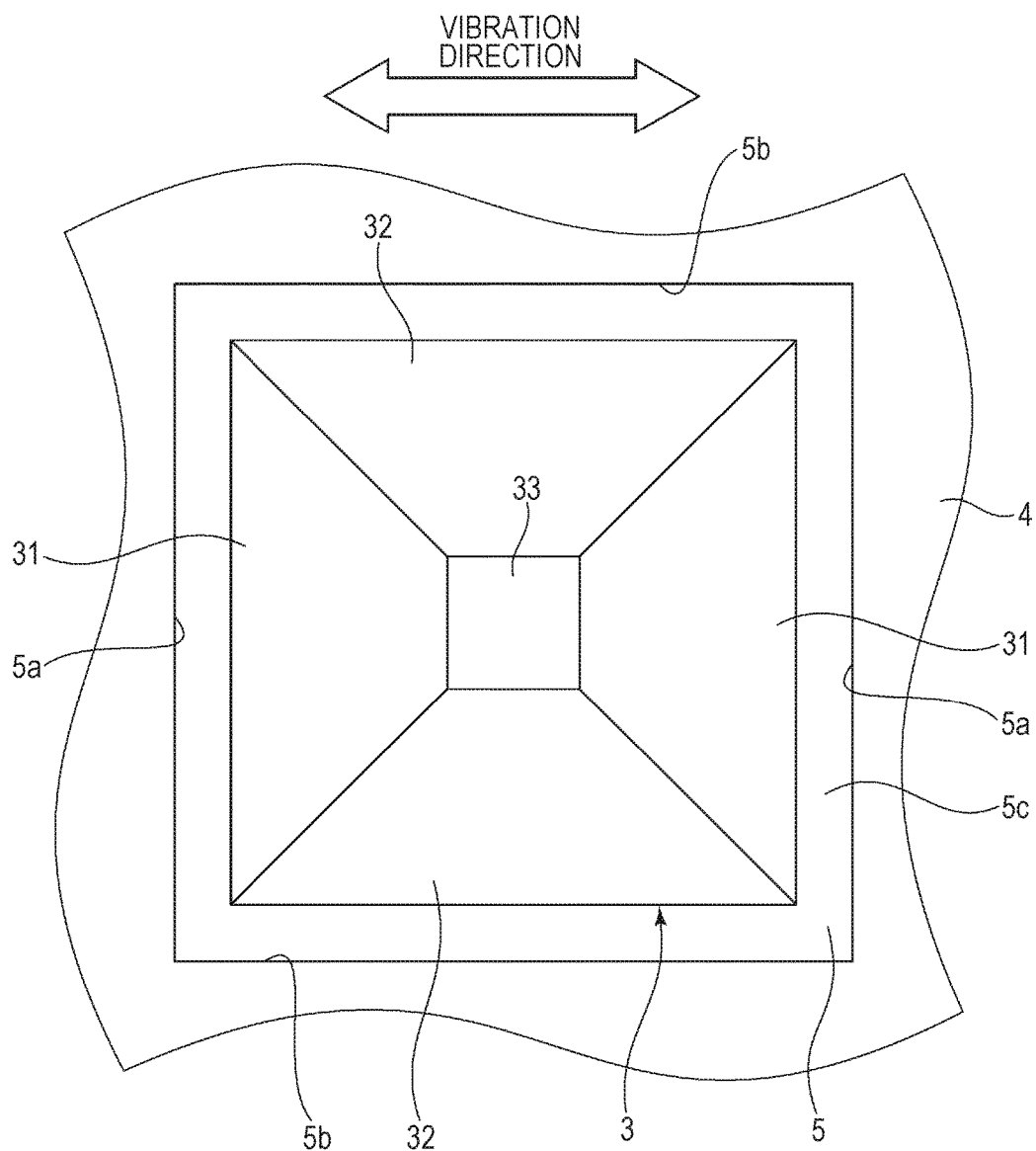
FIG. 5 is an enlarged view of a surrounded portion B in FIG. 2B and is a plan view illustrating the shapes of the protrusion and the recessed portion.

As illustrated in FIGS. 3 to 5, the recessed portions 5 are disposed at the peripheral areas of the protrusions 3 on the planar portion among protrusions 4. The recessed portions 5 are recessed on a side (an upper side) opposite to the projection direction (the lower direction) of the protrusions 3 with respect to the surface of the planar portion among protrusions 4 at all the peripheral areas of the protrusions 3. Accordingly, the recessed portion 5 is configured (formed) so as to have an approximately identical shape to the base end of the protrusion 3. In details, as illustrated in FIGS. 4 and 5, the recessed portions 5 are partitioned by first inner walls 5a and second inner walls 5b. The first inner walls 5a are each opposed to the first walls 31 of the protrusion 3 disposed opposed to one another along the vibration direction. The second inner walls 5b are each opposed to the second walls 32 of the protrusion 3 disposed opposed to one another approximately perpendicular to the vibration direction. The recessed portion 5 has a rectangular shape in the lower surface view. A bottom surface 5c of the recessed portion 5 is configured so as to be a flat surface approximately parallel to the lower end surface of the body 2.

The first inner walls 5a and the second inner walls 5b of the recessed portion 5 are each separated from the first walls 31 and the second walls 32 of the protrusion 3 at predetermined intervals and are formed approximately perpendicular to or approximately parallel to the vibration direction. Furthermore, the base end of the protrusion 3 is disposed upright from the bottom surface 5c of the recessed portion 5. Note that the base end of the protrusion 3 may be disposed upright from the first inner walls 5a or the second inner walls 5b of the recessed portion 5. Furthermore, the distal end side of the protrusion 3 projects downward from an opening of the recessed portion 5. A height H of a projecting part at the distal end of the protrusion 3 is configured smaller than a thickness T of the metal foil 10 (see FIG. 8A). This height H of the projecting part at the distal end of the protrusion 3 may be a distance from the surface of the planar portion among protrusions 4 to the protrusion end surface 33 along a normal direction of the surface of the planar portion among protrusions 4. The height H of the projecting part at the distal end of the protrusion 3 may be in a range of 5 to 200 μm and is preferably in a range of 10 to 70 μm. The height H of the projecting part at the distal end of the protrusion 3 may be in a range of ¼ to 9/10 times of the thickness T of the metal foil 10 and is preferably in a range of ⅓ to ⅘ times.

Next, the following describes an ultrasonic bonding method that bonds the metal foil 10 and the busbar 11 together using the head 1. As illustrated in FIG. 6A, a load and the vibration are applied to the protrusions 3 while the protrusions 3 bit into the metal foil 10. Accordingly, the load and a force F1 caused by the vibration act, in the approximately vibration direction, on the metal foil 10 via the first walls 31, which are arranged so as to be opposed to one another along the vibration direction. Furthermore, the protrusion end surfaces 33 cause a pressing force F2 to act on the metal foil 10 approximately vertically. As illustrated in FIG. 6B, the second walls 32 are surfaces extending parallel to the vibration direction. Therefore, depending on the pair of second walls 32, which are disposed opposed to one another approximately perpendicular to the vibration direction, the above-described force F1 hardly acts on the metal foil 10. The pressing force F2 acts approximately vertically by the protrusion end surfaces 33. Thus, the protrusion end surfaces 33 of the protrusions 3 cause the pressing force F2 to act on the metal foil 10 approximately vertically. This ensures efficient transmission of the ultrasonic vibration to the metal foil 10. Accordingly, the oxide and other dirt on the metal surfaces of the metal foil 10 and the busbar 11 can be removed. Consequently, the bonding between the metal atoms can be easily performed.

Figure 7A:
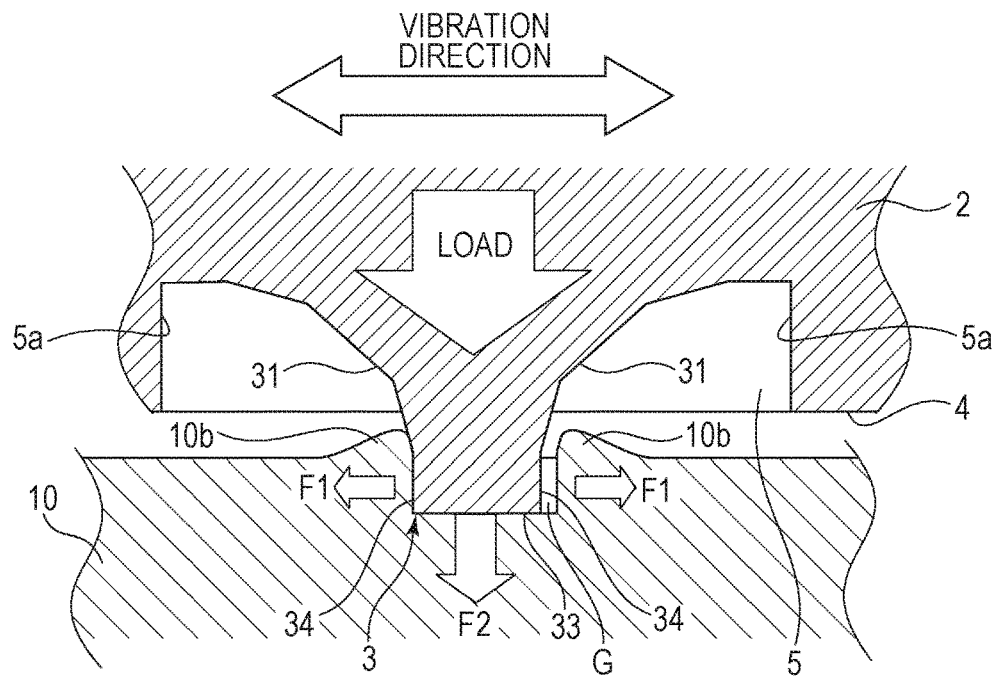
FIGS. 7A and 7B are front cross-sectional views illustrating a relationship between the protrusion and the recessed portion and bulges of metal foil components in the ultrasonic bonding according to the first embodiment.
Figure 7B:
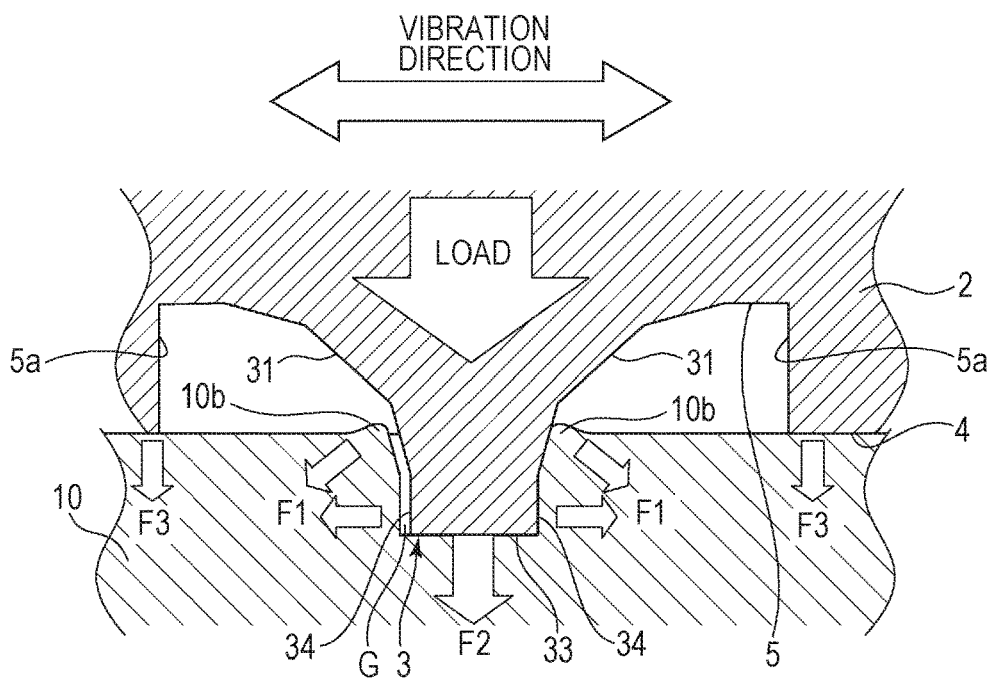

To bond the metal foil 10 and the busbar 11 together using the head 1, first, as illustrated in FIG. 7A, the perpendicular surface portions 34 at the distal end side of the protrusion 3 are set in the state of biting into the metal foil 10. In this state, the force F1 acts on the metal foil 10 in the approximately vibration direction by the first walls 31, which are disposed opposed to one another along the vibration direction. Consequently, components of the metal foil 10 are pressed up (the base end side of the protrusions 3) along the first walls 31. Thus, bulges 10b are formed on the metal foil 10. Here, in the first walls 31, the perpendicular surface portions 34 on the distal end side of the protrusion 3 are formed approximately perpendicular to the vibration direction. Therefore, the force acting such that the components of the metal foil 10 are pressed up by the first walls 31 can be restrained while the protrusions 3 bite into the metal foil 10. A fine clearance G illustrated in FIGS. 7A and 7B is formed between the first wall 31 and the surface of the metal foil 10 by the vibration of the protrusions 3 when the protrusions 3 bite into the metal foil 10. Additionally, although the illustration is omitted for convenience of explanation, the force F1 does not actually act on between the second walls 32, which constitute the side surfaces disposed opposed to one another approximately perpendicular to the vibration direction, and the surface of the metal foil 10. Therefore, the bulge 10b of the component of the metal foil 10 and the fine clearance G are not formed at this part or are formed but small to be negligible.

Next, as illustrated in FIG. 7B, when the protrusions 3 further bite into the metal foil 10, the planar portion among protrusions 4 abuts on the surface of the metal foil 10. At this time, the bulges 10b of the components of the metal foil 10 formed along the first walls 31 are held in the recessed portions 5. In other words, the planar portion among protrusions 4 can abut on the surface of the metal foil 10 while the protrusions 3 bite into the metal foil 10 without a hindrance from the bulges 10b of the components of the metal foil 10.

As illustrated in FIGS. 7A and 7B, the first walls 31 are configured such that the inclination angle with respect to the vibration direction increases in stages from the perpendicular surface portions 34 at the distal end side of the protrusion 3 to the base end. Accordingly, as the protrusions 3 bite into the metal foil 10, the direction that the force F1 caused by the load and the vibration act on the metal foil 10 can head not only for the approximately vibration direction but also approximately vertically. This ensures causing both the force F1 by the first walls 31 and the pressing force F2 by the protrusion end surfaces 33 to act on the metal foil 10 approximately vertically. Additionally, the first walls 31 (and the second walls 32) of the protrusion 3 are configured such that the inclination angle with respect to the vibration direction increases in stages from the perpendicular surface portions 34 at the distal end side to the base end. This inclination angle is an angle outside the protrusion 3 among the angles formed by the first wall 31 (the second wall 32) of the protrusion 3 and the lower end surface (the planar portion among protrusions 4) of the body 2. This facilitates the biting of the protrusions 3 into the metal foil 10 in a process of transitioning from the state illustrated in FIG. 7A to the state illustrated in FIG. 7B. The above-described inclination angle of the first wall 31 (the second wall 32) with respect to the vibration direction may be an angle inside the protrusion 3 among the angles formed by the first wall 31 (the second wall 32) of the protrusion 3 and the lower end surface (the planar portion among protrusions 4) of the body 2. In this case, the inclination angle decreases in stages from the perpendicular surface portion 34 at the distal end side to the base end.

Here, the following describes, in detail, the state in which the protrusions 3 bite into the metal foil 10 up to a desired depth with reference to FIG. 7B illustrating this state. In the state where the planar portion among protrusions 4 abuts on the surface of the metal foil 10, the perpendicular surface portions 34 of the protrusions 3 are arranged approximately perpendicular to the vibration direction on the distal end side of the first walls 31. Therefore, the force F1 mainly acts in the vibration direction. Consequently, the components of the metal foil 10 are less likely to be pressed up. The inclination with respect to the vibration direction decreases on the base end side of the first walls 31 such that the base end sides of the first walls 31 are continuous with the planar portion among protrusions 4. Therefore, the force F1 mainly acts approximately vertically in cooperation with a pressing force F3 by the planar portion among protrusions 4. Consequently, the force F3 and the force F1 press and expand the bulges 10b of the components of the metal foil 10 by pressing the bulges 10b downward.

Figure 8A:
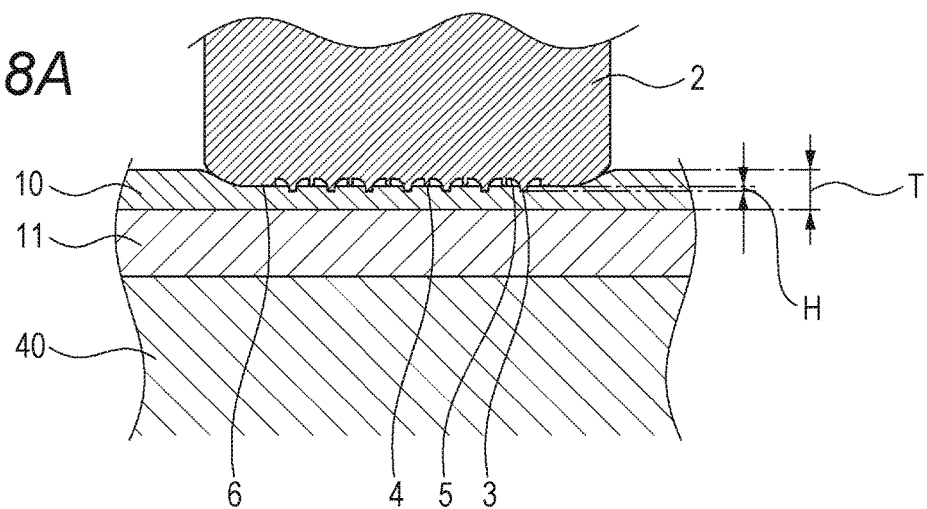
FIG. 8A is a front cross-sectional view illustrating a state of the ultrasonic bonding of the metal foil with the busbar according to the first embodiment.

As illustrated in FIG. 8A, the height H of the projecting part at the distal end of the protrusion 3 is configured to be smaller than the thickness T of the metal foil 10. Therefore, the protrusion 3 does not penetrate the metal foil 10. Accordingly, while the protrusions 3 bite into the metal foil 10, the surface of the metal foil 10 can be pressed by the planar portion among protrusions 4 and the annular planar portion 6. Thus, using the wide range of the lower end surface of the body 2 of the head 1, the pressing force and the ultrasonic vibration can be transmitted to the metal foil 10 and the busbar 11.

In the head 1 according to the present embodiment, when the protrusions 3 are pressed to the metal foil 10 and bite into the metal foil 10, the bulges 10b of the components of the metal foil 10, which are generated at all the peripheral areas (especially both sides in the vibration direction) of the protrusions 3, are held in the recessed portions 5, which are recessed on the side opposite to the projection direction of the protrusions 3. This ensures excellent contact of the planar portion among protrusions 4 with the surface of the metal foil 10. This allows maintaining the force caused by the vibration acting on the opposed surfaces 10a and 11a of the metal foil 10 with the busbar 11 large. Consequently, the force caused by the pressing force and the vibration can efficiently act on the metal foil 10, thereby ensuring excellent bonding of the metal foil 10 with the busbar 11.

Additionally, the distal ends of the protrusions 3 do not penetrate the metal foil 10 or contact the busbar 11. Therefore, the strength of the metal foil 10 during processing is maintained, thereby allowing the excellent contact of the planar portion among protrusions 4 with the surface of the metal foil 10. Since this increases the contacted areas of the head 1 with the metal foil 10, the pressing force can approximately uniformly act on the metal foil 10. Consequently, the bonding strength between the metal foil 10 and the busbar 11 can be enhanced.

The recessed portion 5 is formed so as to have the approximately identical shape to the base end of the protrusion 3. Therefore, the first inner walls 5a and the second inner walls 5b of the recessed portion 5 are each arranged in a complementary manner to the first walls 31 and the second walls 32 of the protrusion 3. This ensures easily holding the bulges 10b of the components of the metal foil 10, which are generated by being pressed up by the first walls 31 and the second walls 32 of the protrusions 3, in the recessed portions 5.

The base end of the protrusion 3 is disposed upright from the bottom surface 5c of the recessed portion 5. This allows increasing a capacity inside the recessed portions 5 to hold the bulges 10b of the components of the metal foil 10, which are generated by being pressing up by the first walls 31 and the second walls 32 of the protrusions 3.

The cross-sectional surface of the protrusion 3 has the rectangular shape. Therefore, the vibration is likely to transmit to the metal foil 10 by the first walls 31 positioned in the vibration direction of the protrusions 3. Additionally, a volume of recessed portions 13 described later, which are formed on the metal foil 10 by the biting by the protrusions 3, can be decreased by the second walls 32 along the vibration direction of the protrusions 3.

The protrusion end surface 33 at the distal end of the protrusion 3 is configured so as to be the flat surface approximately parallel to the lower end surface of the body 2. Therefore, the metal foil 10 can be pressed by the planar portion among protrusions 4 and the protrusion end surfaces 33 at the distal ends of the protrusions 3. Therefore, the pressing force can act on the metal foil 10 to be approximately uniform.

The protrusion 3 includes the perpendicular surface portions 34 on the distal end sides of the first walls 31. Accordingly, the distal ends of the first walls 31 positioned in the vibration direction become approximately perpendicular to the vibration direction. Therefore, the vibration can be more likely to transmit to the metal foil 10 by the first walls 31 positioned in the vibration direction of the protrusions 3.

Figure 8B:
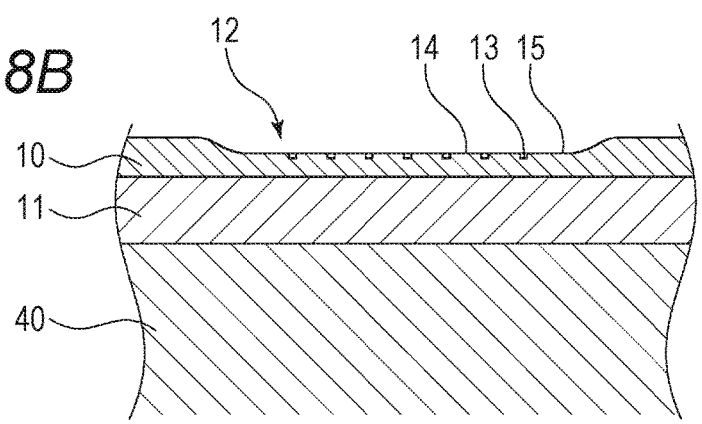
FIG. 8B is a front cross-sectional view illustrating a structure of a bonding portion after the ultrasonic bonding.
Figure 8C:
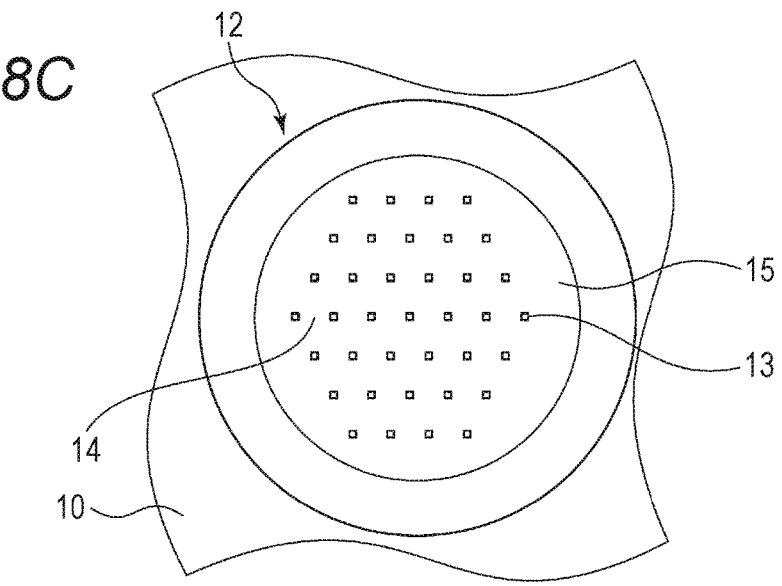
FIG. 8C is a plan view illustrating the structure of the bonding portion after the ultrasonic bonding viewed from the above.

Next, the following describes the bonding structure of the metal foil 10 with the busbar 11 formed by ultrasonic bonding using the head 1. As illustrated in FIGS. 8B and 8C, a circular bonding portion 12, which slightly sinks, is formed on the surface of the metal foil 10 pressed by the head 1. The bonding portion 12 includes the plurality of recessed portions 13 with closed bottoms, a flat portion among recessed portions 14, which is formed among the adjacent recessed portions 13, and an annular flat portion 15. The annular flat portion 15 is a part where the recessed portions 13 are not formed and formed across the whole circumference on the outer diameter side of the recessed portions 13.

Figure 9A:
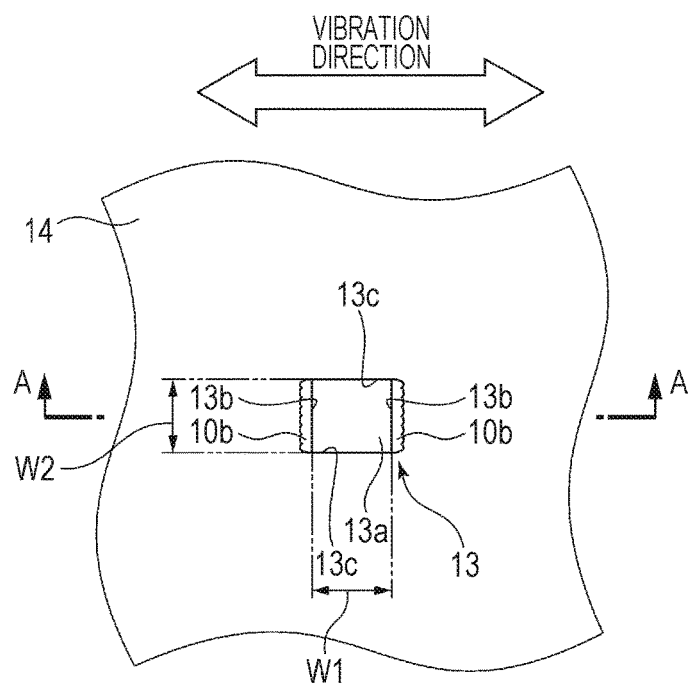
FIG. 9A is a plan view illustrating a structure of a recessed portion formed at a surface of the metal foil by the ultrasonic bonding according to the first embodiment viewed from the above.
Figure 9B:
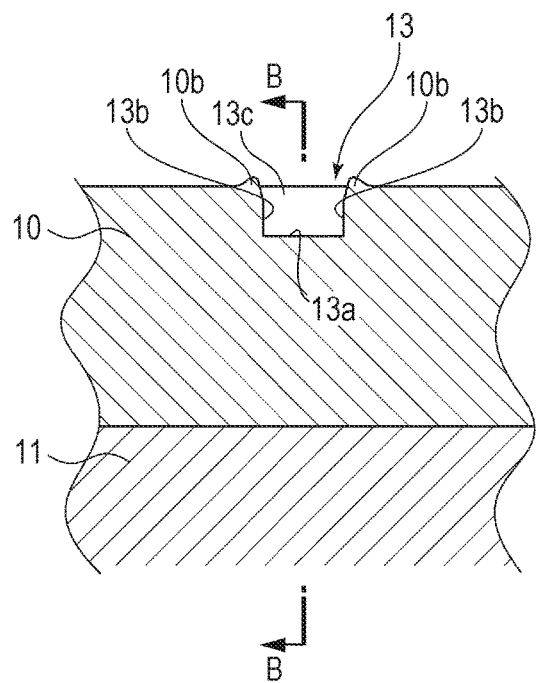
FIG. 9B is a front cross-sectional view of the recessed portion taken along an A-A cross-sectional surface in FIG. 9A.
Figure 9C:
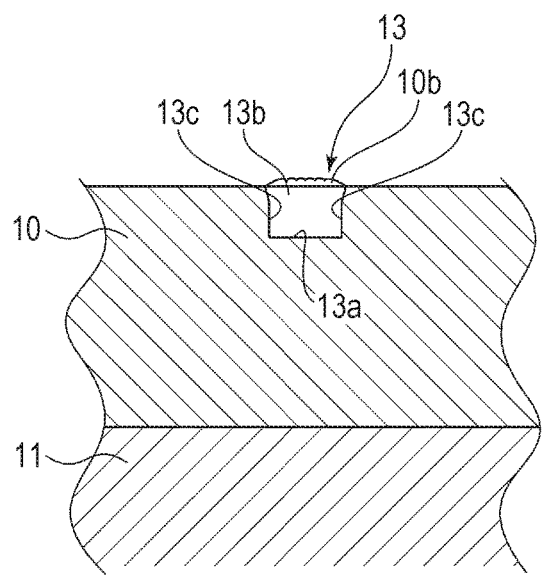
FIG. 9C is a cross-sectional side view of the recessed portion taken along a B-B cross-sectional surface in FIG. 9B.

As illustrated in FIGS. 9A to 9C, the recessed portion 13 on the bonding portion 12 has a rectangular bottom surface 13a, a pair of first side surfaces 13b, and a pair of second side surfaces 13c. The pair of first side surfaces 13b is opposed to one another along the vibration direction. The pair of second side surfaces 13c is opposed to one another along a direction approximately perpendicular to the vibration direction. A width dimension W1 of the second side surface 13c is slightly larger than a width dimension W2 of the first side surface 13b by the amount of the width dimension of the above-described fine clearance G. As described above, the fine clearance G is formed between the first wall 31 and the surface of the metal foil 10 by the vibration of the protrusions 3. Furthermore, the bulge 10b of the component of the metal foil 10 is formed on the opening of the recessed portion 13 on the bonding portion 12 along the first side surface 13b.

According to the present embodiment, the recessed portions 13 with the closed bottoms of the bonding portion 12 do not penetrate the metal foil 10. This widens the bonded regions between the metal foil 10 and the busbar 11. Furthermore, whether the ultrasonic vibration is provided to the metal foil 10 or not is found by the presence/absence of the bulges 10b of the components of the metal foil 10, which are formed along the openings of the recessed portions 13 on the bonding portion 12 by the vibration of the protrusions 3 of the head 1. Accordingly, whether the metal foil 10 and the busbar 11 are correctly bonded together or not can be determined.

The metal foil 10 and the busbar 11 are bonded together between the adjacent recessed portions 13, that is, the flat portion among recessed portions 14 formed pressed by the planar portion among protrusions 4 of the head 1 and the annular flat portion 15 formed pressed by the annular planar portion 6 of the head 1. Therefore, the bonded regions between the metal foil 10 and the busbar 11 are approximately uniformly bonded together on the bonding portion 12. Consequently, the bonding strength between the metal foil 10 and the busbar 11 can be further enhanced.

Second Embodiment

Figure 10:
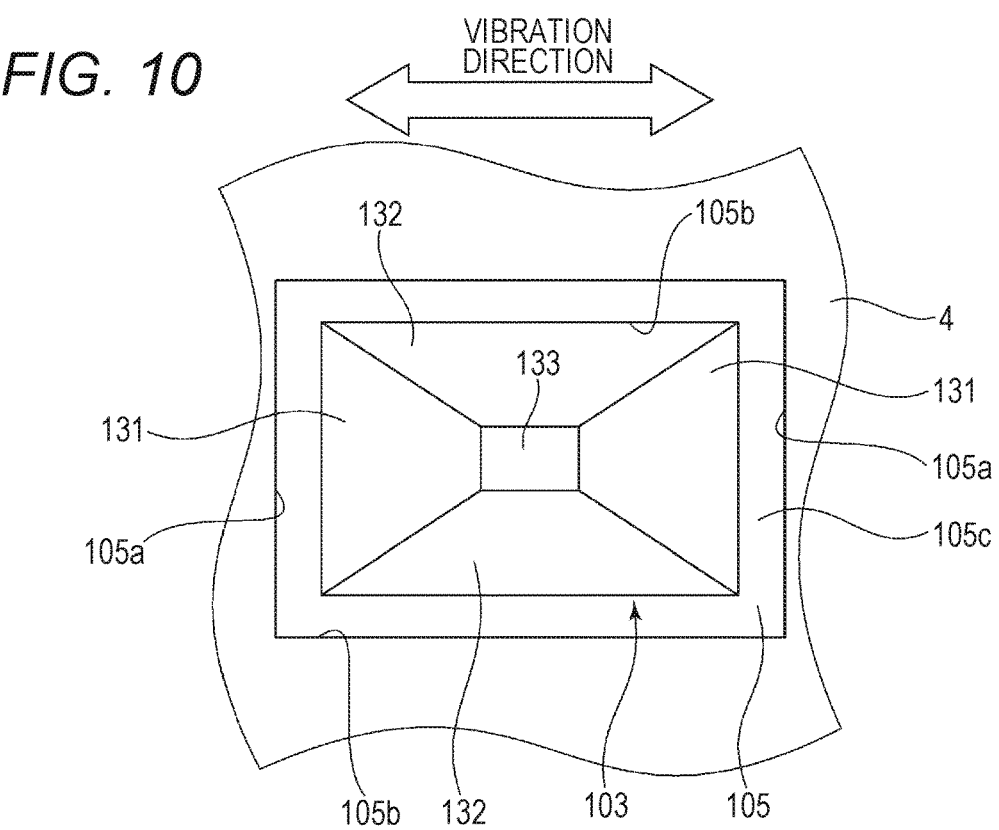
FIG. 10 is a plan view illustrating shapes of a protrusion and a recessed portion according to a second embodiment of the present disclosure.

Next, the following describes an ultrasonic bonding jig according to the second embodiment with reference to FIG. 10. Like reference numerals designate identical elements throughout the embodiments, and therefore such elements will not be further elaborated here.

As illustrated in FIG. 10, a head (the ultrasonic bonding jig) according to the second embodiment includes protrusions 103 instead of the protrusions 3 in the head 1 described in the first embodiment. As illustrated in FIG. 10, the protrusion 103 has first walls 131, second walls 132, and a protrusion end surface 133. The first walls 131 constitute a pair of side surfaces arranged so as to be opposed to one another along the vibration direction. The first walls 131 are side surfaces of the protrusion 103, the side surfaces being positioned in the vibration direction. The second walls 132 constitute a pair of side surfaces extending approximately parallel to the vibration direction and arranged so as to be opposed to one another along the direction approximately perpendicular to the vibration direction. The second walls 132 are side surfaces of the protrusion 103, the side surfaces being positioned in a direction approximately perpendicular to the vibration direction. The protrusion end surface 133 is arranged at the distal end of the protrusion 103. The protrusion end surface 133 is constituted so as to be a flat surface approximately parallel to the lower end surface of the body 2. Thus, the protrusion 103 has a truncated square pyramid shape including the first walls 131, the second walls 132, and the protrusion end surface 133. A cross-sectional surface of the protrusion end surface 133, the cross-sectional surface parallel to the lower end surface of the body 2, has a rectangular shape. The first wall 131 of the protrusion 103 is configured so as to have a width dimension smaller than that of the second wall 132. This forms the outer shape of the protrusion 103 into the rectangular shape.

Recessed portions 105 disposed adjacent to the peripheral areas of the protrusions 103 on the planar portion among protrusions 4 are recessed on a side (an upper side) opposite to the projection direction (the lower direction) of the protrusions 103 at all the peripheral areas of the protrusions 103 with respect to the surface of the planar portion among protrusions 4. Accordingly, the recessed portion 105 is configured (formed) so as to have the approximately identical shape (the rectangular shape) to the base end of the protrusion 103. In details, the recessed portions 105 are partitioned by first inner walls 105a and second inner walls 105b. The first inner walls 105a are each opposed to the first walls 131 of the protrusion 103 disposed opposed to one another along the vibration direction. The second inner walls 105b are each opposed to the second walls 132 of the protrusion 103 disposed opposed to one another approximately perpendicular to the vibration direction. The recessed portion 105 has a rectangular shape in the lower surface view. A bottom surface 105c of the recessed portion 105 is configured so as to be a flat surface approximately parallel to the lower end surface of the body 2.

In the head according to the embodiment, the recessed portion 105 is formed so as to have the approximately identical shape to the base end of the protrusion 103. Therefore, the first inner walls 105a and the second inner walls 105b of the recessed portion 105 are each arranged in a complementary manner to the first walls 131 and the second walls 132 of the protrusion 103. This ensures easily holding the bulges 10b of the components of the metal foil 10, which are generated by being pressed up by the first walls 131 and the second walls 132 of the protrusions 103, in the recessed portions 105.

In the protrusion 103, the first walls 131, which are disposed opposed to one another along the vibration direction, have the width dimension smaller than that of the second walls 132, which are disposed opposed to one another approximately perpendicular to the vibration direction. Accordingly, the protrusion 103 is constituted so as to have a small rectangular shape. This allows decreasing the volume of the recessed portions 13 on the bonding portion 12 formed on the metal foil 10 by the biting of the protrusions 103.

Third Embodiment

Figure 11:
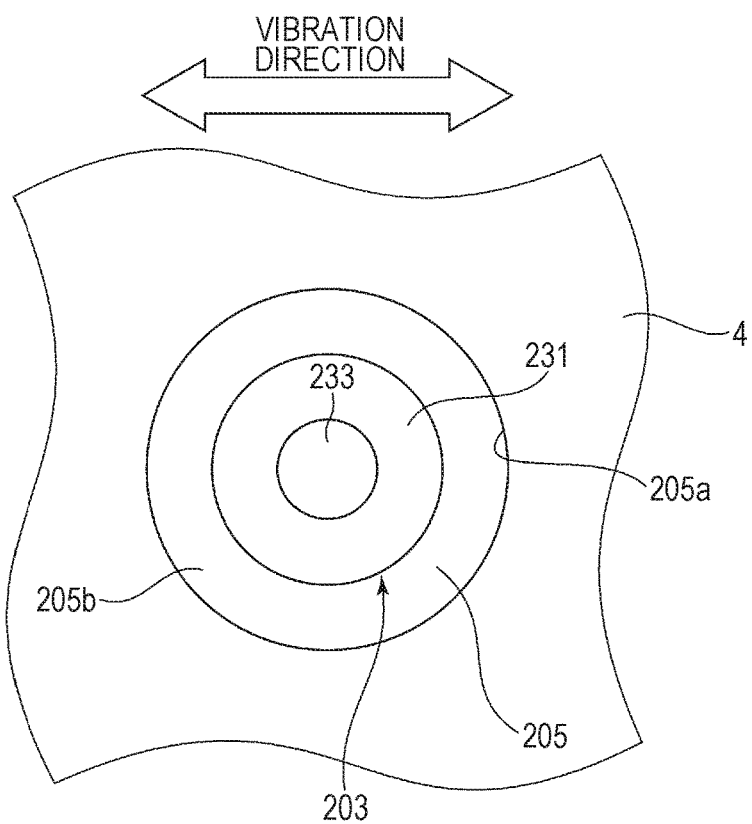
FIG. 11 is a plan view illustrating shapes of a protrusion and a recessed portion according to a third embodiment of the present disclosure.

Next, the following describes an ultrasonic bonding jig according to the third embodiment with reference to FIG. 11. Like reference numerals designate identical elements throughout the embodiments, and therefore such elements will not be further elaborated here.

As illustrated in FIG. 11, a head (the ultrasonic bonding jig) according to the third embodiment includes protrusions 203 instead of the protrusions 3 in the head 1 described in the first embodiment. As illustrated in FIG. 11, the protrusion 203 has an arc-shaped wall 231 and has a circular cross-sectional surface. Furthermore, a protrusion end surface 233 at a distal end of the protrusion 203 is configured so as to be a flat surface approximately parallel to the lower end surface of the body 2.

Recessed portions 205 disposed adjacent to the peripheral areas of the protrusions 203 on the planar portion among protrusions 4 are recessed on a side (an upper side) opposite to the projection direction (the lower direction) of the protrusions 203 at all the peripheral areas of the protrusions 203 with respect to the surface of the planar portion among protrusions 4. Accordingly, the recessed portion 205 is configured (formed) so as to have the approximately identical shape (the circular shape) to the base end of the protrusion 203. In details, the recessed portions 205 are partitioned by arc-shaped inner walls 205a, which are opposed to the walls 231 of the protrusions 203. The recessed portion 205 has a circular shape in the lower surface view. A bottom surface 205b of the recessed portion 205 is configured so as to be a flat surface approximately parallel to the lower end surface of the body 2.

In the head according to the present embodiment, the recessed portion 205 is formed so as to have the shape approximately identical to the base end of the protrusion 203. Therefore, the inner walls 205a of the recessed portions 205 are arranged in a complementary manner with respect to the walls 231 of the protrusions 203. This ensures easily holding the bulges 10b of the components of the metal foil 10, which are generated by being pressed up by the walls 231 of the protrusions 203, in the recessed portions 205.

Fourth Embodiment

Figure 12:
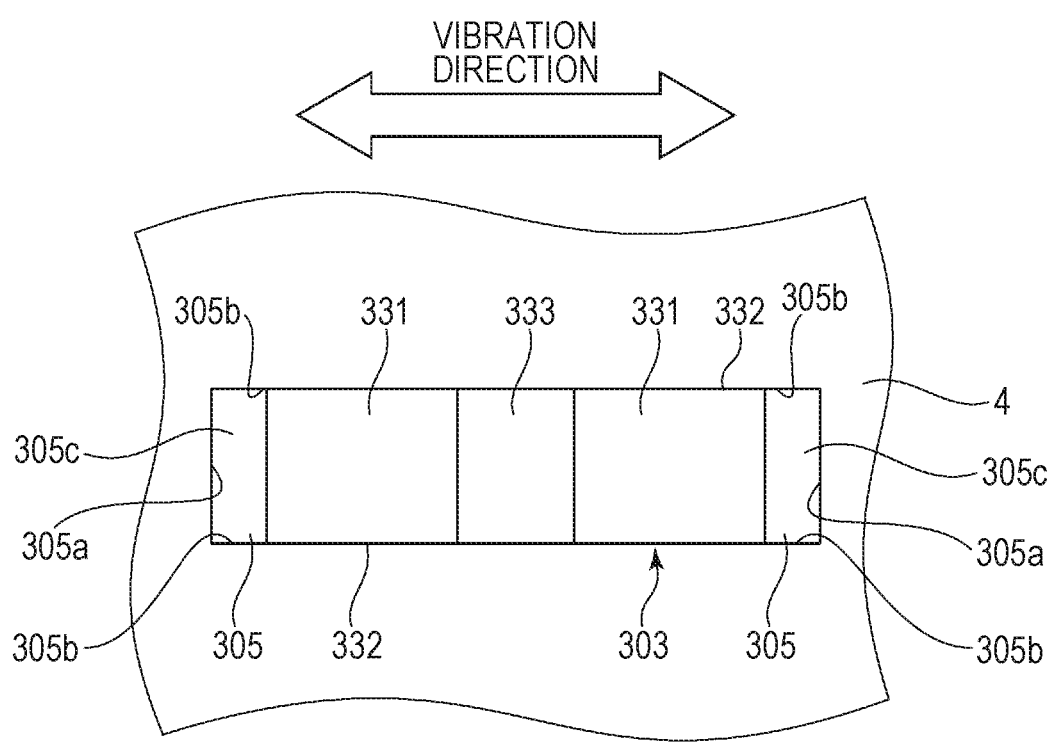
FIG. 12 is a plan view illustrating shapes of a protrusion and a recessed portion according to a fourth embodiment of the present disclosure.

Next, the following describes an ultrasonic bonding jig according to the fourth embodiment with reference to FIG. 12. Like reference numerals designate identical elements throughout the embodiments, and therefore such elements will not be further elaborated here.

As illustrated in FIG. 12, a head (the ultrasonic bonding jig) according to the fourth embodiment includes protrusions 303 instead of the protrusions 3 in the head 1 described in the first embodiment. As illustrated in FIG. 12, the protrusion 303 has first walls 331, second walls 332, and a protrusion end surface 333. The first walls 331 constitute a pair of side surfaces arranged so as to be opposed to one another along the vibration direction. The first walls 331 are side surfaces of the protrusion 303, the side surfaces being positioned in the vibration direction. The second walls 332 constitute a pair of side surfaces extending approximately parallel to the vibration direction and arranged so as to be opposed to one another along the direction approximately perpendicular to the vibration direction. The second walls 332 are side surfaces of the protrusion 303, the side surfaces being positioned in a direction approximately perpendicular to the vibration direction. The protrusion end surface 333 is arranged at the distal end of the protrusion 303. The protrusion end surface 333 is constituted so as to be a flat surface approximately parallel to the lower end surface of the body 2. Thus, the protrusion 303 has a trapezoidal plate shape including the first walls 331, the second walls 332, and the protrusion end surface 333. A cross-sectional surface of the protrusion end surface 333, the cross-sectional surface being parallel to the lower end surface of the body 2, has a rectangular shape. Note that the second wall 332 is a surface having an approximately trapezoidal shape viewed from the direction perpendicular to the vibration direction and is configured as a surface approximately perpendicular to the lower end surface (the planar portion among protrusions 4) of the body 2.

Recessed portions 305 disposed adjacent to the planar portion among protrusions 4 are constituted by being recessed on a side (an upper side) opposite to the projection direction (the lower direction) of the protrusions 303 at both sides of the protrusion 303 with respect to the surface of the planar portion among protrusions 4. In details, the recessed portions 305 are partitioned by first inner walls 305a and second inner walls 305b. The first inner walls 305a are each opposed to the first walls 331 of the protrusion 303 disposed opposed to one another along the vibration direction. The second inner walls 305b are arranged coplanar to the second walls 332 of the protrusion 303 disposed opposed to one another approximately perpendicular to the vibration direction. The recessed portion 305 has a rectangular shape in the lower surface view. A bottom surface 305c of the recessed portion 305 is configured so as to be a flat surface approximately parallel to the lower end surface of the body 2.

In the head according to the present embodiment, when the protrusions 303 are pressed to the metal foil 10 and bite into the metal foil 10, the bulges 10b of the components of the metal foil 10, which are generated at both sides in the vibration direction of the protrusions 303, are held in the recessed portions 305, which are recessed on the side opposite to the projection direction of the protrusions 303. This ensures excellent contact of the planar portion among protrusions 4 with the surface of the metal foil 10. This allows maintaining the force caused by the vibration acting on the opposed surfaces 10a and 11a of the metal foil 10 with the busbar 11 large. Consequently, the force caused by the pressing force and the vibration can efficiently act on the metal foil 10, thereby ensuring excellent bonding of the metal foil 10 with the busbar 11.

In the above, the embodiments of the present have been described with the drawings. The specific configuration of the technique in the present is not limited to these embodiments. The above-described embodiments may be changed, and other configurations or steps may be added to the above-described embodiments, in a range without departing from the gist of the present.

For example, with the embodiments, the shape of the body 2 of the head 1 is not limited to be the cylindrical shape and may be freely configured according to the shape of the base material on which the ultrasonic bonding is performed with the metal foil. The base material on which the ultrasonic bonding is performed with the metal foil is not limited to the busbar and may be freely selected, for example, may be various terminals or a cable.

In the embodiments, the height H of the projecting parts at that distal end sides of the protrusions 3, 103, 203, and 303 projecting from the openings of the recessed portions 5, 105, 205, and 305 are configured to be smaller than the thickness T of the metal foil 10. The configuration is not limited to this. As long as the planar portion among protrusions and the annular planar portion at the lower end surface of the head can abut on the surface of the metal foil and the protrusions 3, 103, 203, and 303 do not penetrate the metal foil, the height H of the projecting parts at that distal end sides of the protrusions 3, 103, 203, and 303 projecting from the openings of the recessed portions 5, 105, 205, and 305 may be approximately identical to the thickness of the metal foil.

As long as the plurality of protrusions 3, 103, 203, and 303 has the distal ends projecting from the openings of the recessed portions 5, 105, 205, and 305, the plurality of protrusions 3, 103, 203, and 303 may be configured to have any shape. However, at least the shape of the side surfaces of the protrusions 3, 103, 203, and 303 positioned in the vibration direction preferably has a so-called inwardly protruding, recessed shape, which are recessed to the inside of the protrusions.

The plurality of protrusions 3, 103, 203, and 303 is arranged into the houndstooth pattern. Instead of this, the plurality of protrusions 3, 103, 203, and 303 may be arranged into a grid pattern.

The protrusions 3 may be configured as follows. The protrusions 3 are aligned in the right-left direction along the vibration direction of the head 1. The protrusion 3 has the truncated square pyramid shape by the first walls 31, which constitute the side surfaces disposed opposed to one another so as to be approximately perpendicular to the vibration direction, the second walls 32, which constitute the side surfaces disposed opposed to one another so as to be approximately parallel to the vibration direction, and the protrusion end surface 33, which is disposed at the distal end of the protrusion 3 configured so as to be the flat surface approximately parallel to the lower end surface of the body 2. The cross-sectional shape taken parallel to the lower end surface of the body 2 has a rectangular cross-sectional surface.

The protrusion 103 may be configured as follows. The protrusion 103 has the truncated square pyramid shape by the first walls 131, which constitute the side surfaces disposed opposed to one another so as to be approximately perpendicular to the vibration direction, the second walls 132, which constitute the side surfaces disposed opposed to one another so as to be approximately parallel to the vibration direction, and the protrusion end surface 133, which is disposed at the distal end of the protrusion 103 configured so as to be the flat surface approximately parallel to the lower end surface of the body 2. The cross-sectional shape taken parallel to the lower end surface of the body 2 has a rectangular cross-sectional surface.

The protrusion 303 may be configured as follows. The protrusion 303 has the trapezoidal plate shape by the first walls 331, which constitute the side surfaces disposed opposed to one another so as to be approximately perpendicular to the vibration direction, the second walls 332, which constitute the side surfaces disposed opposed to one another so as to be approximately parallel to the vibration direction, and the protrusion end surface 333, which is disposed at the distal end of the protrusion 303 configured so as to be the flat surface approximately parallel to the lower end surface of the body 2. The cross-sectional shape taken parallel to the lower end surface of the body 2 has a rectangular cross-sectional surface.

The embodiments of the present disclosure may also be the following first to fourth ultrasonic bonding jigs, first ultrasonic bonding method, and first and second bonding structures.

The first ultrasonic bonding jig is an ultrasonic bonding jig that has a plurality of protrusions. The ultrasonic bonding jig vibrates a planar portion among protrusions formed among base ends of the protrusions while pressing the planar portion among protrusions to a metal plate so as to bond the metal plate and a metallic base material together. Recessed portions recessed to a side opposite to a projection direction of the protrusions are at least formed on both sides in a vibration direction of the protrusions.

In the second ultrasonic bonding jig according to the first ultrasonic bonding jig, the recessed portions recessed to the side opposite to the projection direction of the protrusions are formed at all peripheral areas of the protrusions.

In the third ultrasonic bonding jig according to the first or the second ultrasonic bonding jig, the recessed portions are formed to have a shape identical to that of the base ends of the protrusions.

In the fourth ultrasonic bonding jig according to any one of the first to the third ultrasonic bonding jigs, the base ends of the protrusions are disposed upright from bottom surfaces of the recessed portions.

The first ultrasonic bonding method is an ultrasonic bonding method that bonds a metal plate and a metallic base material together using an ultrasonic bonding jig. The ultrasonic bonding jig has a plurality of protrusions and a planar portion among protrusions formed among base ends of the protrusions. The recessed portions recessed to a side opposite to a projection direction of the protrusions are at least formed on both sides in a vibration direction of the protrusions. The ultrasonic bonding method vibrates the ultrasonic bonding jig while pressing the ultrasonic bonding jig to the metal plate thicker than a height of the protrusions.

The first bonding structure is formed by bonding of a metal plate with a metallic base material. Recessed portions with a closed bottom shape are formed on a surface of the metal plate. A flat portion among recessed portions is formed at peripheral areas of the recessed portions. At the flat portion among recessed portions, bulges of metal plate components are formed along openings of the recessed portions.

In the second bonding structure according to the first bonding structure, the metal plate and the base material are bonded together between the adjacent recessed portions.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An ultrasonic bonding jig comprising:
   a planar surface;
   a plurality of protrusions formed on the planar surface; and
   recessed portions, each of which are recessed in the planar surface, and each recessed portion is recessed to a side opposite to a projection direction of the protrusions along which each of the plurality of protrusions has been projected, the recessed portions being arranged on at least two sides of each of the plurality of protrusions in a direction orthogonal to the projection direction.

2. The ultrasonic bonding jig according to claim 1, wherein
   the recessed portions are formed at all peripheral areas of the protrusions.

3. The ultrasonic bonding jig according to claim 1, wherein
   the recessed portions are formed to have a shape identical to that of the base ends of the protrusions.

4. The ultrasonic bonding jig according to claim 1, wherein
   base ends of the protrusions are disposed upright and include at least a pair of side walls with a predetermined inclination angle with respect to bottom surfaces of the recessed portions from the bottom surfaces of the recessed portions.

5. The ultrasonic bonding jig according to claim 1, wherein the recessed portions are arranged at least in a vibration direction of the plurality of protrusions.

6. The ultrasonic bonding jig according to claim 5, wherein the recessed portions are arranged in a direction perpendicular to the vibration direction.

* * * * *